Sept. 21, 1965 G. W. FILSON 3,206,775
COMBINATION BED, CHAIR, DESK AND LOUNGE
STRUCTURE FOR SPACE VEHICLES
Filed May 8, 1964 3 Sheets-Sheet 1
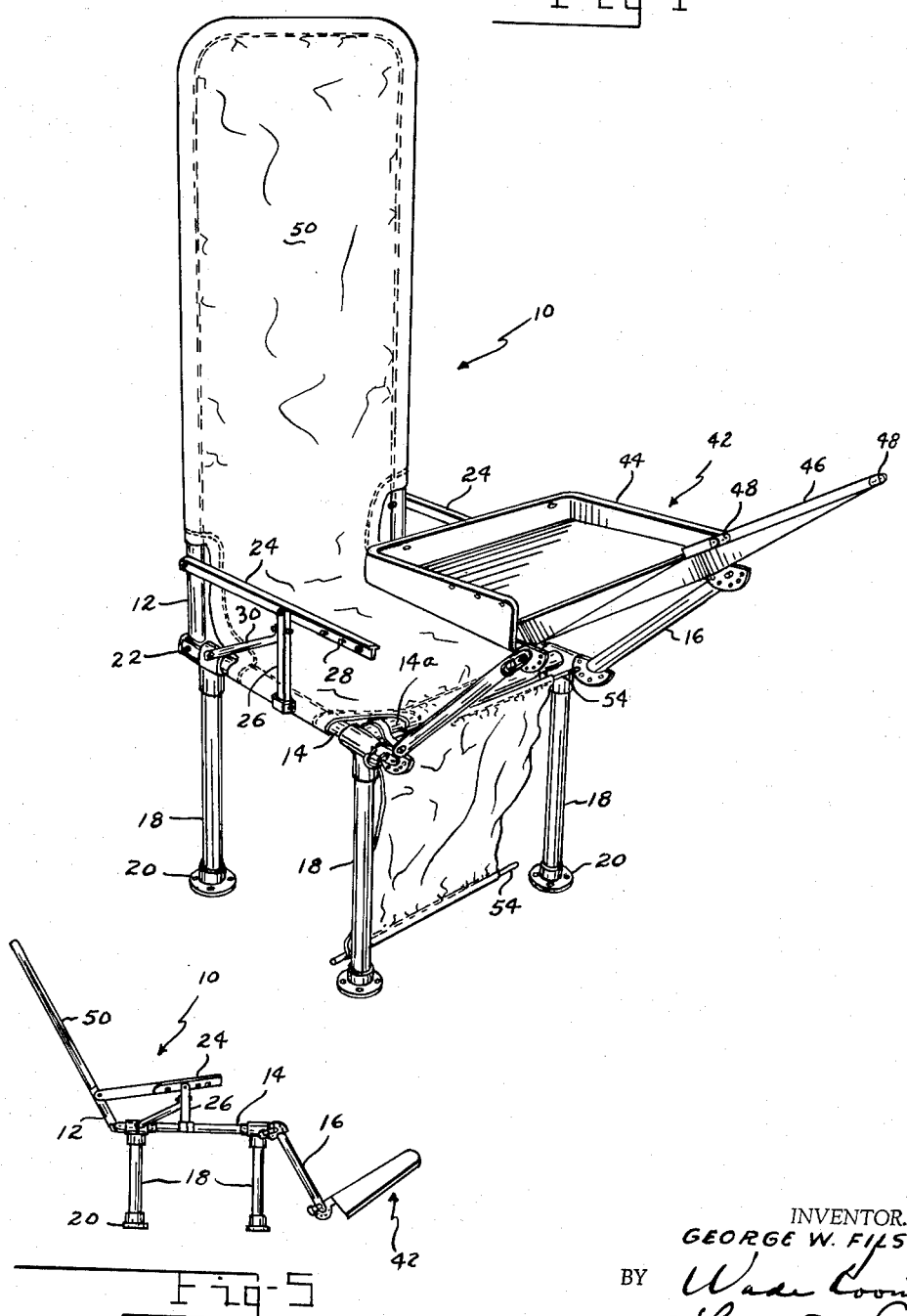
INVENTOR.
GEORGE W. FILSON
BY
ATTORNEYS

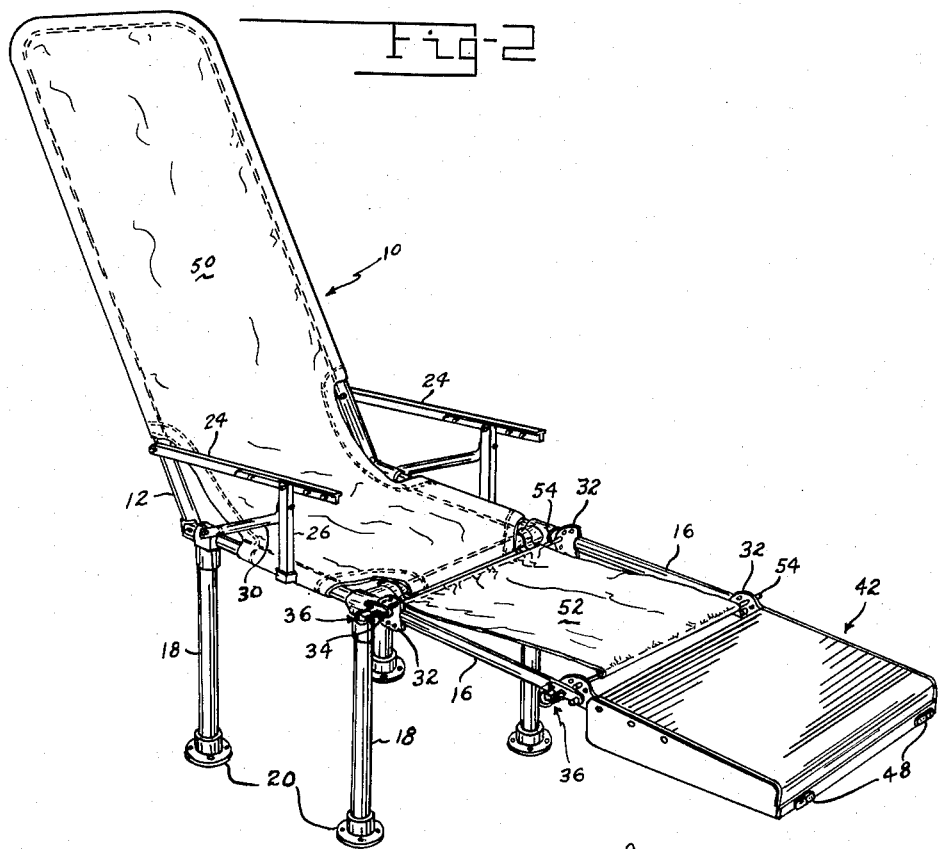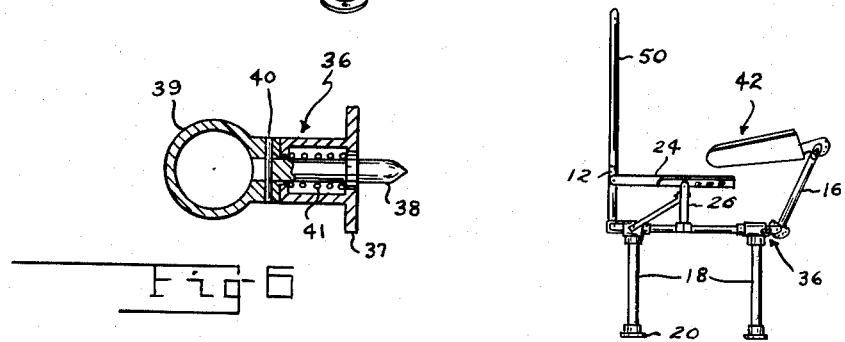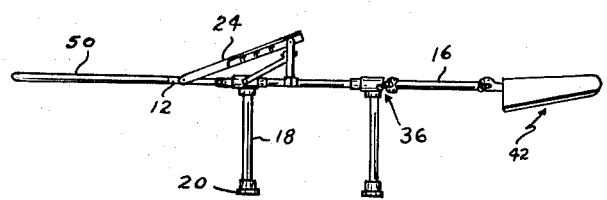

Sept. 21, 1965  
G. W. FILSON  
COMBINATION BED, CHAIR, DESK AND LOUNGE  
STRUCTURE FOR SPACE VEHICLES  
Filed May 8, 1964

INVENTOR.  
GEORGE W. FILSON  
BY  
ATTORNEYS

United States Patent Office 3,206,775
Patented Sept. 21, 1965

3,206,775
COMBINATION BED, CHAIR, DESK AND LOUNGE STRUCTURE FOR SPACE VEHICLES
George W. Filson, Xenia, Ohio, assignor to the United States of America as represented by the Secretary of the Air Force
Filed May 8, 1964, Ser. No. 366,198
4 Claims. (Cl. 5—118)
(Granted under Title 35, U.S. Code (1952), sec. 266)

The invention described herein may be manufactured and used by or for the United States Government for governmental purposes without the payment to me of any royalty thereon.

This invention relates to furniture, and more specifically to furniture which is readily adjustable to various body positions and to various purposes. While not limited to such use, and for purposes of illustrating the novelty and utility of the present structure, it will be disclosed in connection with its use in space vehicles.

Space vehicles, at best, are extremely compact, functional structures in which, out of necessity, the comfort of the occupants is of secondary consideration. As a result, occupiable space is at a premium, and huge sums have been expended on the design of equipment and on environmental and physiological testing to best adapt humans to the available limited space.

The occupants of space vehicles, during a day's lapse of time, must eat, sleep, work and relax; in fact, in one form or another, their cycle in the vehicle simulates their normal cycle in their natural environment. Various furniture has been designed and tested which will conserve space while permitting the occupants to perform their functions. For example: beds which are attached to, and which fold against a wall of the vehicle when not occupied; and folding chairs which may be racked when not in use. The combination structure to be disclosed, has been found by extended test in a simulation tank to occupy less space than previous structures, to combine into one structure the functions previously requiring several structures, and to be preferred by the using personnel.

The primary object of the present invention is to provide a combination bed, chair, desk and lounge which is ideally adapted for use in space vehicles.

Another object of the present invention is to provide a combination structure of the above character having convenient means for anchoring the structure to a space vehicle to thereby overcome the attitude and weightlessness problems encountered by non-anchored structures.

A further object of the present invention is to provide a combination structure having maximum body support and ventilation in all positions.

Yet another object of the present invention is to provide a combination structure having the lightest possible weight commensurate with its strength requirements.

A yet further object of the present invention is to provide a combination structure in which a plurality of the pivoted indexing joints may be simultaneously actuated.

Additional objects, advantages and features of the invention reside in the construction, arrangement and combination of parts involved in the embodiment of the invention as will appear from the following description and accompanying drawings, wherein:

FIG. 1 is a perspective of the structure in the position of a desk and showing the lid of the desk-rest structure in the open position;

FIG. 2 is a perspective of the structure in the lounging position;

FIG. 3 is a side elevation of the structure in the desk position with the lid of the desk-rest structure in the closed position;

FIG. 4 is a side elevation of the structure in the bed position with the back support and seat support forming a plane horizontal surface;

FIG. 5 is a side elevation of the structure in a chair position;

FIG. 6 is a section through a typical spring biased indexing pin assembly; and

Figure 7:
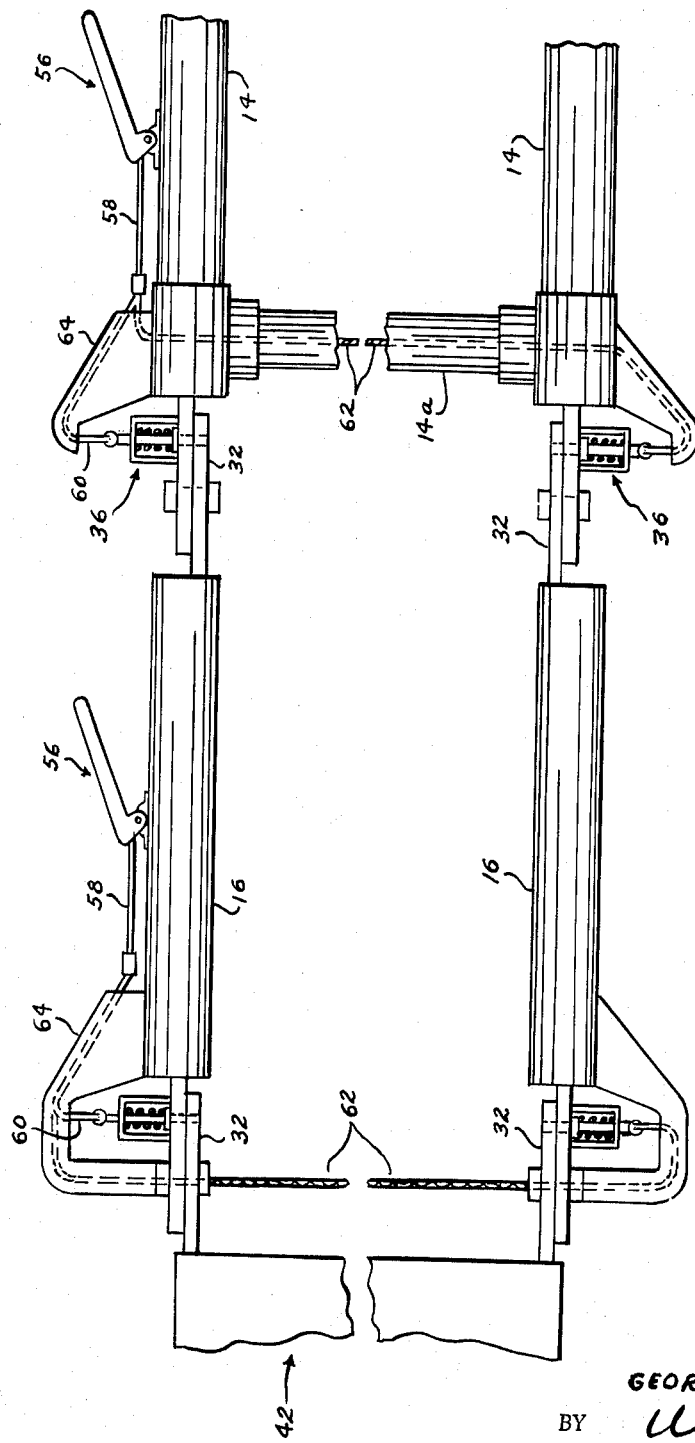
FIG. 7 is a plan view showing two optional actuators, each actuator lifting two index pins.

Referring specifically to FIG. 5, the combination bed, chair, desk and lounge structure comprising this invention will be hereinafter referred to as combination structure 10. Two portions of this structure, which may be identified with a portion of the user's body, will be hereinafter referred to as the back support and the seat support.

Referring more specifically to FIG. 1, the seat support frame 14 comprises two horizontal tubular members as shown; these members being joined at the front portion thereof by a tubular cross member 14a. The seat support frame 14 has four depending legs 18 joined thereto; each leg at the lower end terminating in a mounting flange 20 for rigidly joining to a floor portion of the space vehicle. It is noted that the seat support frame 14, as described, is U-shaped; consisting of two tubular side members joined at the front by a cross member. This structure is completely stable, since it is firmly joined to the floor of the space vehicle. The desirability of not having a cross member, similar to cross member 14a, at the rear of the seat support frame will be hereinafter explained. The back support frame 12 is formed to be a tubular U-shaped structure with the ends thereof pivotally joined to the ends of seat support frame 14 by means of pivot pins 22.

Pivotally joined to each side member of back support frame 12 is a forwardly extending arm rest 24 supported at the forward end by a support member 26 joined to the seat support frame as shown. The upper end of each support member 26 has a pin for engaging slots 28 in the arm rest 24, to hold the back support at one of its several predetermined positions with the seat support ranging from a plane position to 90° above, as shown on FIG. 1, FIG. 2 and FIG. 4. A brace 30 is added at each side to firmly hold support member 26 in position.

Referring to FIG. 2, the combination structure 10 has two tubular linking members 16 for joining the desk-rest structure 42 to the seat support frame 14 as shown. The tubular linking members must index to a plurality of positions ranging from substantially 70° below the seat support as shown on FIG. 5 to substantially 75° above the seat support as shown on FIG. 3. The rear end of each linking member 16 terminates in a quadrant disc 32 having a fixed pivot pin 34 at the arcuate center, and having a plurality of indexing holes spaced on an arc about the fixed pivot pin 34. Joined to the seat support frame 14, so as to engage the indexing holes in each quadrant disc 32, is an indexing pin assembly 36; an enlarged cross section of which is shown at FIG. 6. The indexing pin assembly is of conventional design and consists of a body member 37 which houses a bullet nose indexing pin 38 to which a pull ring 39 is joined by means of a pin 40. A compression spring 41, disposed between the pin and the body, applies a biasing force. Other convenient multi-position indexing devices may be substituted for the one shown and described.

Pivotally joined to the forward end of each linking member 16 is the desk-rest structure 42. The desk-rest structure has two quadrant discs 32 which are pivotally joined to the forward end of each linking member 16 in the same manner as each linking member is joined to the seat support frame. Each quadrant disc must provide sufficient rotary movement about the fixed pivot pin that the desk-rest structure may be pivotally indexed to positions between one extreme shown on FIG. 3 to the other extreme position shown on FIG. 4. The desk-rest structure comprises an open box member 44, to which a lid member 46 is hinged (hinges not shown). The open box member 44 may be made to any convenient depth to provide space for paper, pencils, magazines and personal effects. The lid member 46 is shown in the open position on FIG. 1 and in the closed position on FIG. 3. Suitable latches, such as latches 48 shown on FIG. 1 and FIG. 2, may be provided to hold the lid member in the closed position.

Although the back support frame 12 and the seat support frame 14 may be covered in the conventional manner with slats, webbing, pads or other means, they are preferably covered with a suitable single piece of woven nylon netting 50. This material has been found to be more suitable than the more conventional materials. The nylon netting has been found to be more comfortable because it gives contoured body support over the greatest body area while also providing adequate ventilation. The area between linking members 16 is covered with a similar nylon netting 52 which is supported by rods 54. The rods 54 are supported by vacant holes in the quadrant discs 32 and may be changed at will. The netting 52 is in the attached position when the structure is in the attitudes shown on FIG. 2 and FIG. 4. The netting is either completely detached, or has one end detached as shown on FIG. 1, when the structure is in the attitudes shown on FIG. 1 and FIG. 3. When the structure is in the position shown on FIG. 5, netting 52 may remain attached; or, it may be detached at the user's option.

The desk-rest structure 42, when in the position shown on FIG. 1 and FIG. 3, provides a desk or a convenient eating surface. When in the position shown on FIG. 5, the desk-rest structure is used as a foot rest. On FIG. 4 the desk-rest structure is shown outwardly extended and forms the foot end of the bed. It is noted that, because the seat support structure 14 is built as a U-shape structure without a cross member at the rear end, the occupant of the bed is completely supported by the netting 50 between his head and knees without contacting uncomfortable metal parts.

The combination structure 10, above described, may be modified to facilitate the ease with which the structure may be changed from one position to another. Referring to FIG. 7, an actuating means is shown by which, with one hand manipulation, two indexing pin assemblies 36 may be disengaged to permit the operator's free hand to reposition the unlatched portion of the structure. A pivoted squeeze bar assembly 56 is joined to the side of the seat support frame 14 and to the side of one linking member 16. When squeezed, each squeeze bar assembly pulls a rod 58 joined thereto. Joined to the free end of each rod 58 are two cables 60 and 62, which pass through guide blocks 64 and connect to the pull rings on the indexing pin assemblies. The addition of the squeeze bar assemblies is particularly useful on applications where the combination structure is mounted very close to a wall in the space vehicle.

It is to be understood that the embodiment of the present invention as shown and described is to be regarded as illustrative only and that the invention is susceptible to variations, modifications and changes within the scope of the appended claims.

I claim:

1. A combination bed, chair, desk and lounge structure for space vehicles and comprising: a horizontal U-shaped seat support frame open at the rear, leg means depending from said seat support frame for attaching to the floor portion of the space vehicle, a U-shaped back support frame having the ends of the side members pivotally joined to the ends of the side members of said U-shaped seat support frame, a non metallic body supporting netting means joined to and extending from the closed end of said seat support frame to the closed end of said back support frame, adjusting means cooperating between said seat support frame and said back support frame for adjusting said back support frame to a plurality of angular positions ranging between a first rearward extending position substantially plane with said seat support frame and a second position substantially 90° above said seat support frame, a desk-rest structure having an open box member and a lid member hinged thereto for closing said box member, two linking members each pivotally joined at a first end to said desk-rest structure and having a second end pivotally joined to the forward end of said seat support frame, a non-metallic body supporting netting means detachably joined to be between said linking members, a first adjustable indexing means cooperating between the second end on each of said linking members and said seat support frame for indexing said linking members to a plurality of angular positions ranging from positions below to positions above said seat support frame including a position substantially plane with said seat support frame, and a second adjustable indexing means cooperating between the first end on each of said linking members and said desk-rest structure for indexing said desk-rest structure to a foot rest position when said linking members are indexed to be plane with said seat support frame, and to an inwardly inclined desk position when said linking members are indexed above said seat support frame.

2. A combination bed, chair, desk and lounge structure in accordance with claim 1 and further having:
   (a) a first actuating means joined to said seat support frame and communicating with each of said first adjustable indexing means for the simultaneous actuation thereof, and
   (b) a second actuating means joined to one of said linking members and communicating with each of said second adjustable indexing means for the simultaneous actuation thereof.

3. A combination bed, chair, desk and lounge structure for space vehicles and comprising: a horizontal seat support, leg means depending from said seat support for attachment to the floor portion of the space vehicle, a back support pivotally joined to the rear portion of said seat support, adjusting means cooperating between said seat support and said back support for adjusting said back support to a plurality of angular positions ranging between a first rearward extending position substantially plane with said seat support and a second position substantially 90° above said seat support, a desk-rest structure having an open box member and a lid member hinged thereto for closing said box member, two linking members each pivotally joined at a first end to said desk-rest structure and having a second end pivotally joined to the forward end of said seat support, a first adjustable indexing means cooperating between the second end of each of said linking members and said seat support for indexing said linking members to a plurality of angular positions ranging from positions below to positions above said seat support including a position substantially plane with said seat support, a second adjustable indexing means cooperating between the first end on each of said linking members and said desk-rest structure for indexing said desk-rest structure to a foot rest position when said linking members are indexed below said seat support, to an extended plane position when said linking members are indexed to be plane with said seat support, and to an inwardly inclined desk position when said linking members are indexed above said seat support, a first actuating means joined to said seat support and communicating with each of said first adjustable indexing means for the simultaneous actuation thereof, and a second actuating means joined to one of said linking members and communicating with each of said second adjustable indexing means for the simultaneous actuation thereof.

4. A combination bed, chair, desk and lounge structure for space vehicles and comprising: a horizontal seat support, leg means depending from said seat support for attaching to the floor portion of the space vehicle, a back support pivotally joined to the rear portion of said seat support, adjusting means cooperating between said seat support and said back support for adjusting said back support to a plurality of angular positions ranging between a first rearward extending position at substantially 0° with and a second position substantially 90° above said seat support, a desk-rest structure having an open box member and a lid member hinged thereto for closing said box member, two linking members each pivotally joined at a first end to said desk-rest structure and having a second end pivotally joined to the forward end of said seat support, a first adjustable indexing means cooperating between the second end on each of said linking members and said seat support for indexing said linking members to a plurality of positions ranging between substantially 70° below said seat support to 75° above said seat support including a position at substantially 0° with said seat support, a second adjustable indexing means cooperating between the first end on each of said linking members and said desk-rest structure for indexing said desk-rest structure to a foot rest position when said linking members are indexed below said seat support, to an extended horizontal position when said linking members are indexed to be at substantially 0° with said seat support, and to an inwardly inclined desk position when said linking members are indexed above said seat support, a first actuating means joined to said seat support and communicating with each of said first adjustable indexing means for the simultaneous actuation thereof, and a second actuation means joined to one of said linking members and communicating with each of said second adjustable indexing means for the simultaneous actuation thereof.

References Cited by the Examiner
UNITED STATES PATENTS

| | | | |
|---|---|---|---|
| 39,995 | 9/63 | Hunzingen | 297—173 |
| 127,899 | 6/72 | Lauer | 297—360 |
| 261,205 | 7/82 | Champie | 297—173 |
| 2,659,416 | 11/53 | Heyman | 297—359 |

FRANK B. SHERRY, *Primary Examiner.*